(12) United States Patent
Choi et al.

(10) Patent No.: US 9,521,244 B2
(45) Date of Patent: Dec. 13, 2016

(54) MOBILE TERMINAL DISPLAYING APPLICATION EXECUTION ICON GROUPS FOR CORRESPONDING PREDETERMINED EVENTS

(75) Inventors: Woosik Choi, Seoul (KR); Seungyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 12/988,609

(22) PCT Filed: Oct. 13, 2010

(86) PCT No.: PCT/KR2010/007009
§ 371 (c)(1),
(2), (4) Date: May 20, 2011

(87) PCT Pub. No.: WO2012/050248
PCT Pub. Date: Apr. 19, 2012

(65) Prior Publication Data
US 2012/0094719 A1    Apr. 19, 2012

(51) Int. Cl.
*H04M 1/725* (2006.01)
*H04M 1/57* (2006.01)

(52) U.S. Cl.
CPC ..... *H04M 1/72566* (2013.01); *H04M 1/72583* (2013.01); *H04M 1/72597* (2013.01); *H04M 1/575* (2013.01); *H04M 1/72552* (2013.01); *H04M 1/72561* (2013.01); *H04M 1/72572* (2013.01); *H04M 2250/12* (2013.01); *H04M 2250/16* (2013.01); *H04M 2250/22* (2013.01); *H04M 2250/60* (2013.01)

(58) Field of Classification Search
CPC .............. H04M 1/72566; H04M 1/72597; H04M 1/72583; G06F 9/4443; G06F 3/0481; G06F 8/38
USPC ........................................ 715/864, 810, 765
See application file for complete search history.

(56) References Cited

U.S. PATENT DOCUMENTS

| | | | |
|---|---|---|---|
| 6,285,364 B1 * | 9/2001 | Giordano et al. | 715/804 |
| 7,603,629 B1 * | 10/2009 | Crosswhite et al. | 715/772 |
| 2007/0036346 A1 * | 2/2007 | Kwon | 379/413 |
| 2007/0179938 A1 * | 8/2007 | Ikeda et al. | 707/3 |

(Continued)

FOREIGN PATENT DOCUMENTS

KR    10-2009-0025867 A    3/2009

OTHER PUBLICATIONS

"Androkkid—Make Your Windows Mobile Look Like Android", Jeffry Thurana, Dec. 29, 2009, makeuseof.com, 7 pages.*

*Primary Examiner* — Li Sun
(74) *Attorney, Agent, or Firm* — Birch, Stewart, Kolasch & Birch, LLP

(57) ABSTRACT

A mobile terminal including a display module; and a controller configured to display information related to a predetermined event and a first application execution icon group including application execution icons respectively corresponding to applications capable of executing functions using the information related to the event on the display module when the event is generated. Further, the first application execution icon group is predetermined according to the event, and a part of the information related to the event is used to execute a function of an application corresponding to a selected application execution icon in the first application execution icon group.

7 Claims, 26 Drawing Sheets

(56) References Cited

U.S. PATENT DOCUMENTS

| | | |
|---|---|---|
| 2009/0005071 A1* | 1/2009 | Forstall et al. ............ 455/456.1 |
| 2009/0258638 A1 | 10/2009 | Lee |
| 2009/0280863 A1 | 11/2009 | Shin et al. |
| 2009/0327940 A1* | 12/2009 | Duncan .................. G06F 9/542 |
| | | 715/765 |
| 2010/0138763 A1 | 6/2010 | Kim |
| 2011/0066976 A1* | 3/2011 | Hwang ........................ 715/810 |
| 2011/0072492 A1* | 3/2011 | Mohler et al. .................... 726/3 |
| 2011/0098061 A1* | 4/2011 | Yoon .......................... 455/456.3 |
| 2013/0198397 A1* | 8/2013 | Zhang .................. H04W 4/001 |
| | | 709/228 |

* cited by examiner

Figure 29

| Indicator |
|---|
| Owner: Heo Kwang Sun 011-000-0000 |
| Wednesday 6/20   Thursday 7/19   Friday 7/19 |
| 4/25 - 5/25           < ↻ > |
| 4  25Wednesday      Today(25 of April Wednesday, lunar calendar 3/9) |
| 30 Monday    Raise pay Tae Hyun computer Day off |
| 5  4 Friday      Dad noise operation |
| 5 Saturday      5 Saturday |
| 6 Sunday  Computer skills written test |
| 17 Thursday    Cameraman festival |
| 18 Friday      Cameraman festival |
| 19 Saturday    Cameraman festival |
| New |

MOBILE TERMINAL DISPLAYING APPLICATION EXECUTION ICON GROUPS FOR CORRESPONDING PREDETERMINED EVENTS

TECHNICAL FIELD

This document a mobile terminal and a method of controlling the same, and more particularly, to a mobile terminal and a method of controlling the same to change displayed icons according to a generated event and execute functions based on information related to the event.

BACKGROUND ART

As the functions of mobile terminals such as personal computers, laptop computers, cellular phones and the like are diversified, the mobile terminals are constructed in the form of a multimedia player having multiple functions of capturing pictures or moving images, playing music, moving image files and games and receiving broadcasting programs. Furthermore, applications provided by the mobile terminals and events generated in the mobile terminals are diversified.

DISCLOSURE

Technical Problem

An aspect of this document is directed to provide a mobile terminal and a method of controlling the same to display information related to an event when the event is generated and provide applications closely related to the generated event to a user.

Another aspect of this document is to provide a mobile terminal and a method of controlling the same to execute various applications based on the information related to the generated event and contents generated according to the event.

Technical Solution

In an aspect, a mobile terminal comprises a display module and a controller displaying information related to a predetermined event and a first icon group including icons respectively corresponding to applications capable of executing functions using the information related to the event on the display module when the event is generated.

In another aspect, a mobile terminal comprises a display module displaying icons respectively corresponding functions and a controller displaying information related to a generated event when the event is generated, selecting one of the icons in response to a touch operation and executing a function corresponding to the selected icon using at least part of the information related to the event.

In another aspect, a method of controlling a mobile terminal comprises detecting generation of a predetermined event and displaying information related to the event and a first icon group including icons respectively corresponding to applications capable of executing functions using the information related to the event on a display module.

In another aspect, a method of controlling a mobile terminal comprises displaying icons respectively corresponding to functions and displaying information related to an event on a display module when the event is generated, selecting one of the icons in response to a touch operation, and executing a function corresponding to the selected icon using at least part of the information related to the event.

The aforementioned methods of controlling the mobile terminal may be implemented by reading recording media storing programs for executing the methods of controlling the mobile terminal from a computer and executing the programs.

Advantageous Effects

According to the mobile terminal and the method of controlling the same according to embodiments of this document, the user of the mobile terminal can easily execute applications closely related to events generated in the mobile terminal. Furthermore, the user of the mobile terminal can rapidly perform various applications using information related to the generated events.

DESCRIPTION OF DRAWINGS

The implementation of this document will be described in detail with reference to the following drawings in which like numerals refer to like elements.

FIGS. 27, 28 and 29 show images displayed on the mobile terminal when the controlling method shown in FIG. 26 is performed.

MODE FOR INVENTION

Figure 1:
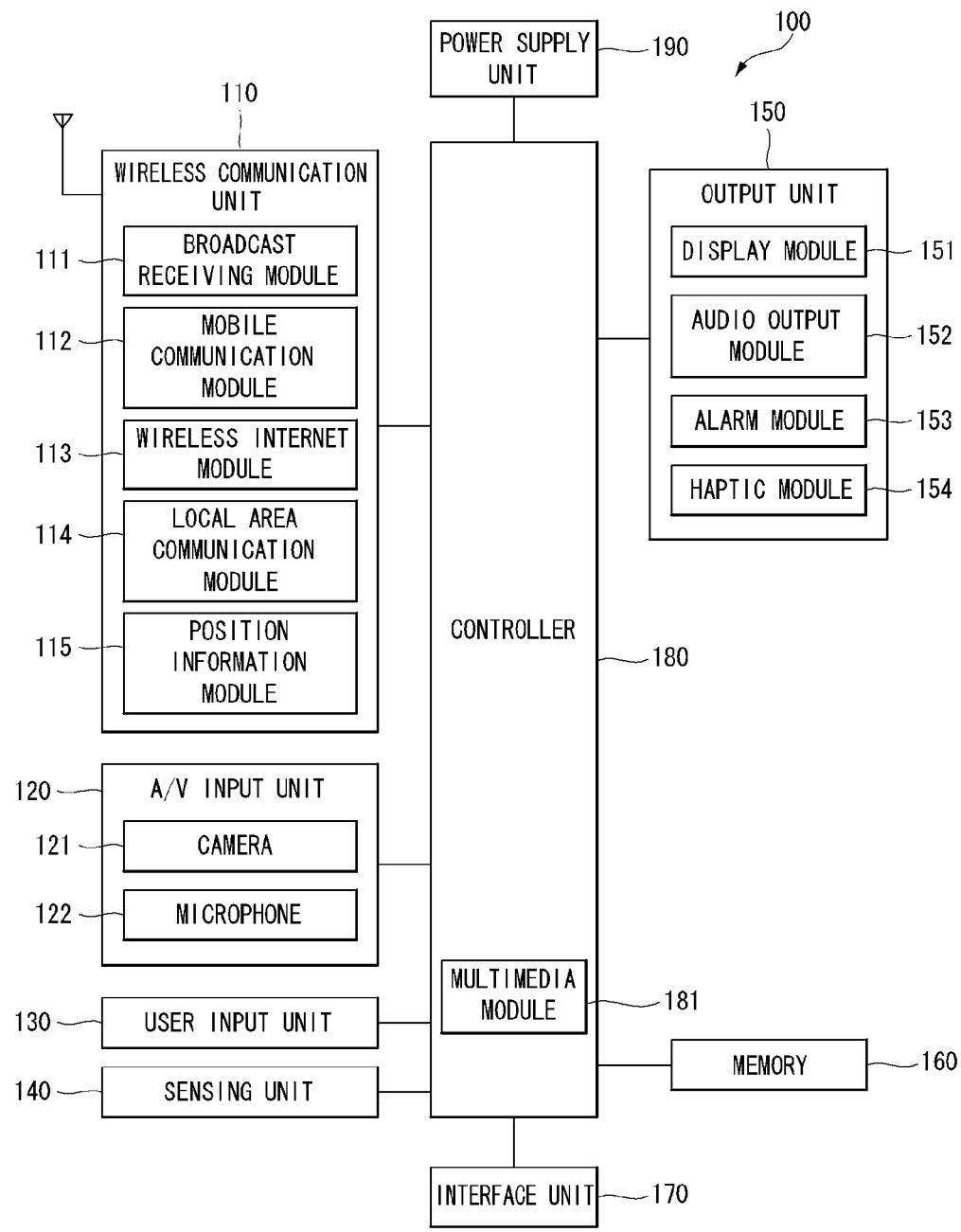
FIG. 1 is a block diagram of an implementation of a mobile terminal.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, there embodiments are provided so that the inventive concept will be thorough and complete, and will fully convey the concept of this document to those skilled in the art. Like reference numerals in the drawings denote like elements. Furthermore, in the following description of the present invention, a detailed description of known functions and configurations incorporated herein will be omitted when it may obscure the subject matter of the present invention.

In the following description, when a component is "connected or inked" to another component, a third component may be connected between the two components although the component may be directly connected or linked to the other component. Furthermore, when a component "transmits or outputs" data or a signal to another component, the component may directly "transmit or output" the data or signal to the other component or may "transmit or output" the data or signal to the other component via a third component.

Hereinafter, a mobile terminal relating to the inventive concept will be described below in more detail with reference to the accompanying drawings.

The mobile terminal described in the specification can include a cellular phone, a smart phone, a laptop computer, a digital broadcasting terminal, personal digital assistants (PDA), a portable multimedia player (PMP), a navigation system and so on. However, implementations described in the specification can be applied to fixed terminals such as digital TV, desktop computers and so on except a case that the implementations can be applied to only the mobile terminal.

FIG. 1 is a block diagram of an implementation of a mobile terminal 100. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MEDIAFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (WI-FI), wireless broadband (Wibro), world interoperability for microwave access (Wimax), high speed downlink packet access (HSDPA) and so on can be used as a wireless Internet technique.

The local area communication module 114 means a module for local area communication. BLUETOOTH, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm 153 and a haptic module 154.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photoelectric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as proximity touch and an action of bring the pointer into contact with the touch screen is referred to as contact touch in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2:
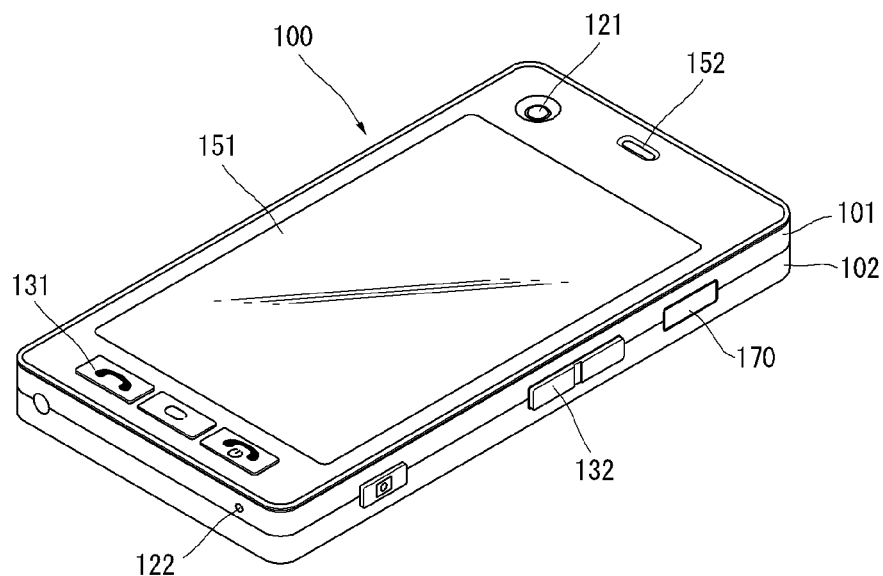
FIG. 2 is a front perspective view of the mobile terminal shown in FIG. 1.

FIG. 2 is a front perspective view of a mobile terminal or a handheld terminal 100 according to an embodiment of the inventive concept.

The handheld terminal 100 has a bar type terminal body. However, the inventive concept is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display module 151, the audio output unit 152, the camera 121, the user input unit 130/131 and 132, the microphone 122 and the interface 170 can be arranged in the terminal body, specifically, in the front case 101.

The display module 151 occupies most part of the main face of the front case 101. The audio output unit 152 and the camera 121 are arranged in a region in proximity to one of both ends of the display module 151 and the user input unit 131 and the microphone 122 are located in a region in proximity to the other end of the display module 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display module 151 to a touch recognition mode.

Figure 3:
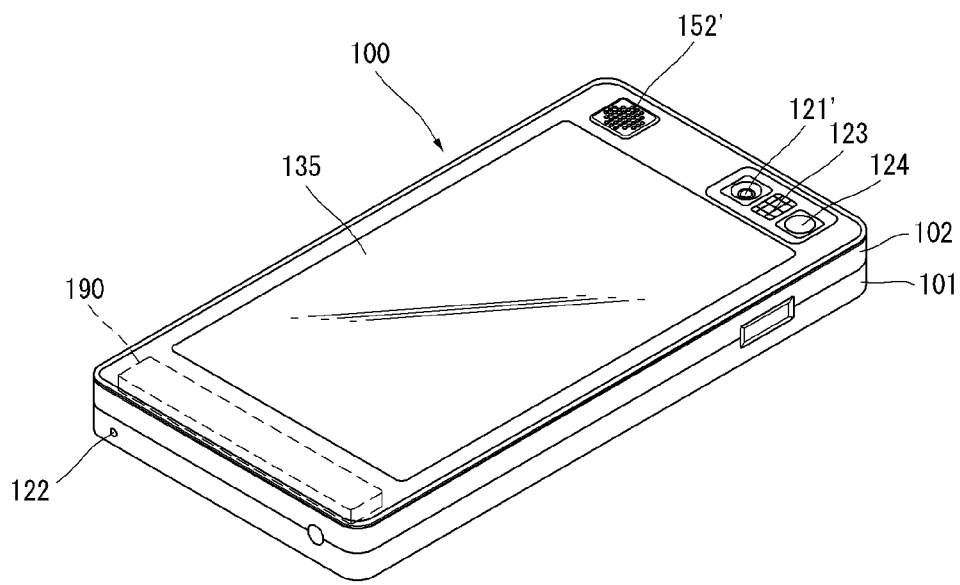
FIG. 3 is a rear perspective view of the mobile terminal shown in FIG. 1.

FIG. 3 is a rear perspective view of the handheld terminal shown in FIG. 2.

Referring to FIG. 2, a camera 121 can be additionally attached to the rear side of the terminal body, that is, the rear case 102. The camera 121 has a photographing direction opposite to that of the camera 121 shown in FIG. 2 and can have pixels different from those of the camera 121 shown in FIG. 2.

For example, it is desirable that the camera 121 has low pixels such that it can capture an image of the face of a user and transmit the image to a receiving part in case of video telephony while the camera 121 has high pixels because it captures an image of a general object and does not immediately transmit the image in many cases. The cameras 121 and 121 can be attached to the terminal body such that they can be rotated or pop-up.

A flash bulb 123 and a mirror 124 are additionally arranged in proximity to the camera 121'. The flash bulb 123 lights an object when the camera 121 takes a picture of the object. The mirror 124 is used for the user to look at his/her face in the mirror when the user wants to self-photograph himself/herself using the camera 121'

An audio output unit 152 can be additionally provided on the rear side of the terminal body. The audio output unit 152 can achieve a stereo function with the audio output unit 152 shown in FIG. 2 and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display module 151. In this case, if the display module 151 outputs visual information through both sides thereof, the visual information can be recognized through the touch pad 135. The information output through both sides of the display module 151 can be controlled by the touch pad 135. Otherwise, a display is additionally attached to the touch pad 135 such that a touch screen can be arranged even in the rear case 102.

The touch pad 135 operates in connection with the display module 151 of the front case 101. The touch pad 135 can be located in parallel with the display module 151 behind the display module 151. The touch panel 135 can be identical to or smaller than the display module 151 in size.

Figure 4:
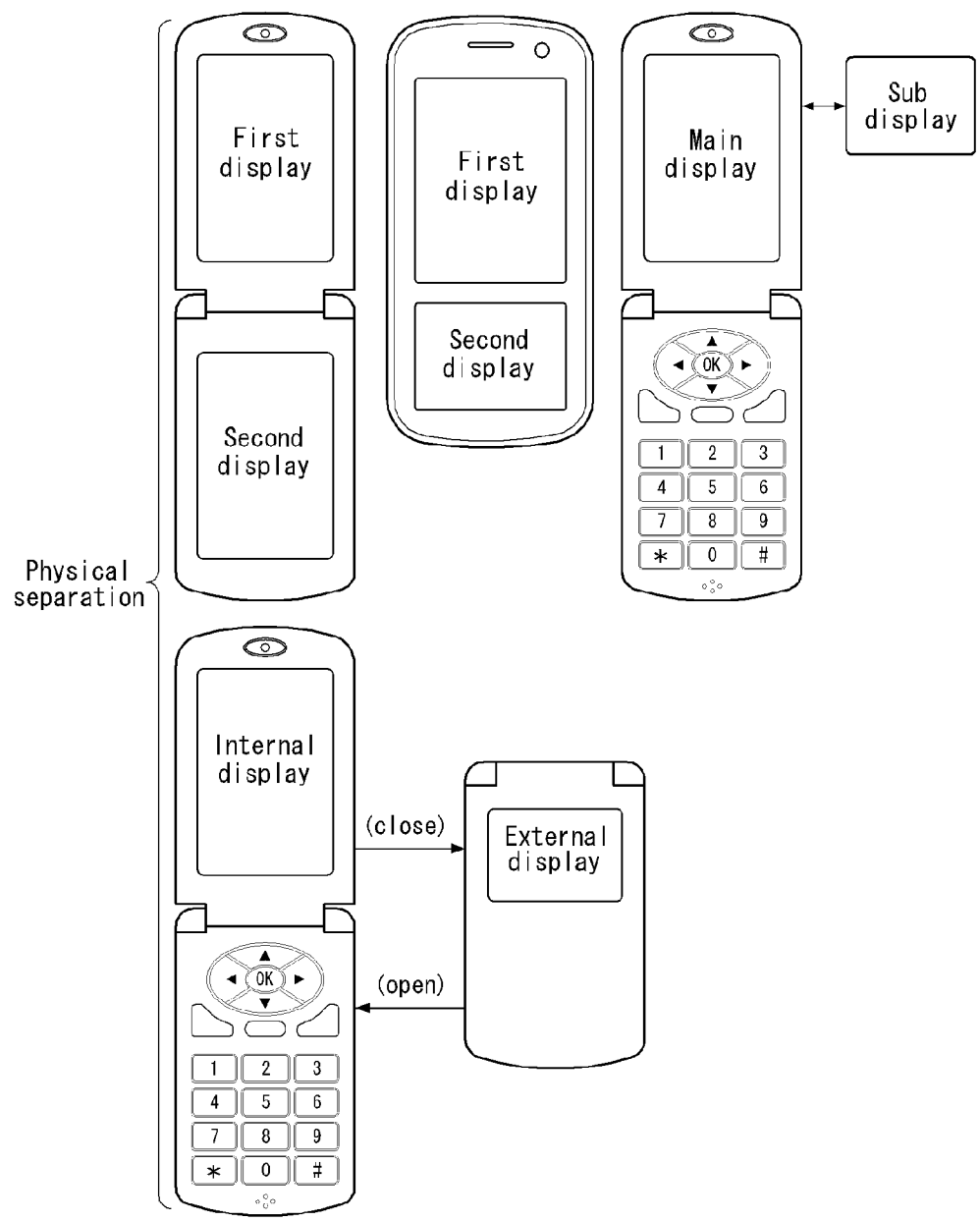
FIG. 4 illustrates implementations of forms of the mobile terminal and display screens.

FIG. 4 illustrates various implementations of the mobile terminal 100 and the display module 151. The display module 151 can include a first display and a second display which are physically separated from each other.

In a folder type or slide type mobile terminal having two bodies connected through a hinge or slide, the first display (or main display) can be formed on the inner face or outer face of one of the bodies and the second display (or sub display) can be formed on the inner face or outer face of the other body.

The sub display is separated from the mobile terminal and detachably combined with the mobile terminal body through an interface to display data from the mobile terminal 100.

The display module 151 can include first and second displays which are logically separated from each other in a display panel, as illustrated in FIG. 2D.

Figure 5:
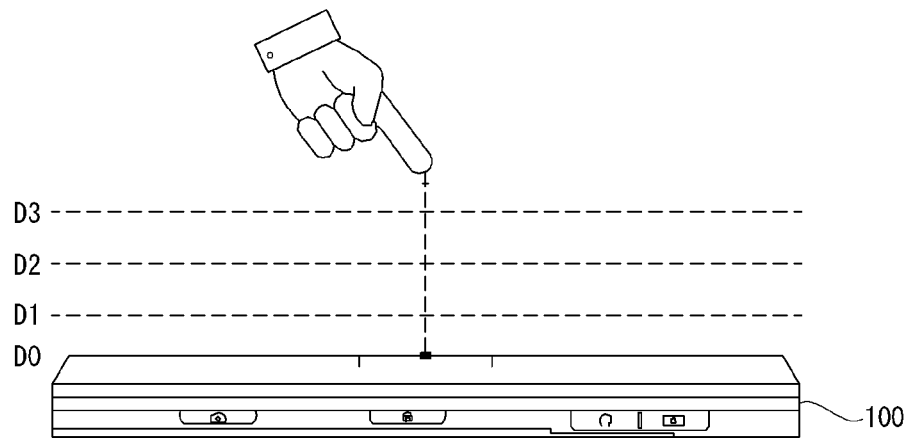
FIG. 5 is a conceptional view for explaining a proximity depth of a proximity sensor.

FIG. 5 is a conceptional view for explaining a proximity depth of the proximity sensor.

As shown in FIG. 5, when a pointer such as a user s finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 5 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth.

When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 6:
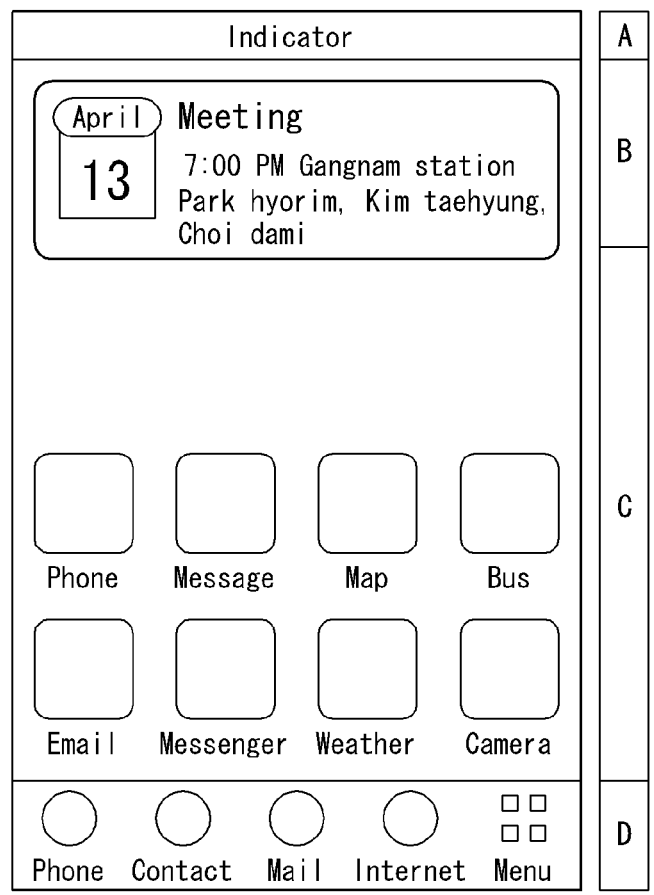
FIG. 6 illustrates an exemplary composition of the screen of the mobile terminal.

The general operations of the mobile terminal 100 have been explained with reference to FIGS. 1 through 5. Operations of the mobile terminal 100 to display information related to an event generated in the mobile terminal 100 on the display module 151 in response to the event, provide applications closely related to the event to the user and execute applications based on the information related to the event and contents generated according to the event will now be described with reference to FIGS. 6 through 29. FIG. 6 illustrates an exemplary composition of the screen of the mobile terminal 100. In the specification, "screen" means a region of the display module 151 of the mobile terminal 100, which outputs image data. Referring to FIG. 6, the screen of the mobile terminal 100 includes a indicator region A, an event information region B, an idle screen region C, and a general menu region D. The screen composition of the mobile terminal 100 shown in FIG. 6 is exemplary and the present invention is not limited thereto. The indicator region A may display information such as the communication state of the mobile terminal 100, date, time, power state, etc. The event information region B may display information related to an event that can be generated in the mobile terminal 100.

In FIG. 6, information related to a schedule alarm event is displayed in the event information region B. More specifically, the information related to the schedule alarm event may include the date and time of a schedule, the contents of the schedule, place and people related to the schedule, etc.

Figure 7:
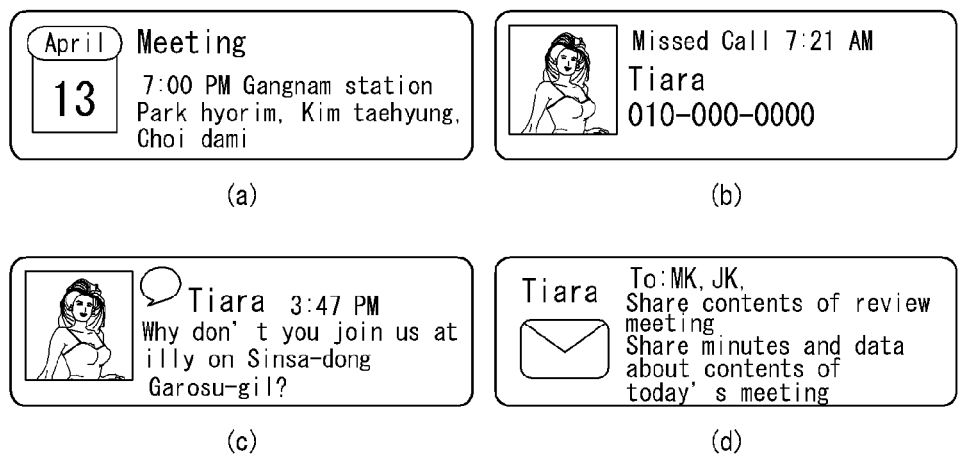
FIG. 7 illustrate exemplary events that can be generated in the mobile terminal.

FIG. 7 illustrates exemplary events that can be generated in the mobile terminal 100. The events may include various alarm related events such as a timer and morning call in addition to the aforementioned schedule alarm (refer to the event information region B of FIG. 5 and FIG. 7(a)). Referring to FIG. 7(b), missed call event related information may include a caller, missed call generation time, and a calling number.

Furthermore, the events may include events related to transmission and receiving of a message (refer to FIGS. 7(c) and 7(d)). Here, the message may include a SMS (Short Message Service) message, a MMS (Multimedia Messaging Service) message, and E-mail. FIG. 7(c) shows information related to an SMS receiving event. Referring to FIG. 7(c), information related to the SMS receiving event may include a message sender, message receiving time, and the whole message contents or part of the message contents. FIG. 7(d) shows information related to an E-mail receiving event. Referring to FIG. 7(d), the E-mail receiving event related information may include a sender, a recipient, a title, and contents of E-mail or parts of the contents of E-mail.

Alarm related events, call transmission/receiving related events and message transmission/receiving related events, which can be generated in the mobile terminal 100, have been described. However, the events are exemplary and the present invention is not limited thereto.

Events, types of information which will be displayed for the events, and programs for generating the information may be stored in the memory 160 in advance.

The idle screen region C may display icons corresponding to applications related to generated events. Here, the applications related to the generated events may be applications having high potential to be executed by a user who confirmed generation of the events or applications that can be usefully used by the user. In FIG. 6, the icons are displayed in the form of a square in the idle screen region C. The icons are displayed in a square shape in other figures. The general menu region D may display menus displayed on an idle screen all the time.

A method of displaying icons in the idle screen region C will now be explained in more detail. When an event is generated, the idle screen region C may display a first icon group including icons respectively corresponding to applications that can execute functions using information related to the event displayed in the event information region B. However, a second icon group including icons respectively corresponding to applications for executing various functions may be displayed in the idle screen region C before the event is generated. The first icon group and the second icon group may include identical icons.

If the display module 151 displays home screens, the second icon group may include icons displayed on home screens other than the current home screen. Here, the current home screen means a home screen on which the first icon group is displayed.

The controller 180 may replace the second icon group with the first icon group when the event is generated. Here, the controller 180 may select the first icon group from icons stored in the memory 160 based on at least one of attribute information of the event and the event related information.

The controller 180 may call the first icon group including icons previously corresponding to events that can be generated and display the first icon group. The events that can be generated and the first icon group previously corresponding to the events may be stored in the memory 160.

The controller 180 may display an icon corresponding to a specific function other than the icons included in the first icon group on the screen according to at least one of the attribute information of the event and the event related information. Here, the icon other than the icons included in the first icon group is not displayed on the screen before the event is generated. However, the icon other than the icons included in the first icon group may be an icon generated based on the attribute information of the event and the event related information.

Detailed examples of applications corresponding to the first icon group with respect to each of meeting schedule alarm, missed call, SMS receiving and E-mail receiving events generated in the mobile terminal 100 will now be explained. For the meeting schedule alarm event, applications corresponding to the first icon group may include an application of calling meeting attendees, an application of generating a message for the meeting attendees, an application of creating E-mail for the meeting attendees, a messenger application for the meeting attendees, an application for checking a meeting place, an application for acquiring transportation information about the meeting place, an Internet search application with respect to the meeting place, etc.

For the missed call event, applications corresponding to the first icon group may include an application of calling a caller, a message generating application, an E-mail creating application, a messenger application, a calling number search application, a caller position search application, etc. For the SMS receiving event and E-main receiving event, applications corresponding to the first icon group may include an application of calling a message or E-mail sender, the message generating application, the E-mail creating application, the messenger application, an application of scheduling contents of a message or E-mail, a message or E-mail sender position search application, etc.

As described above, when information related to a generated event and the first icon group in response to the event are displayed on the screen of the mobile terminal 100, the controller 180 may select one of the icons included in the first icon group in response to a touch operation of the user and execute a function corresponding to the selected icon using at least part of the event related information. Here, the touch operation may mean operating the touch screen of the mobile terminal 100.

The touch operation for selecting one of the icons included in the first icon group may be an operation of moving a touch applied to the event related information to the selected icon. For example, the touch operation may include an operation of dragging the event related information and an operation of dropping the dragged event related information to the selected icon.

Otherwise, the touch operation for selecting one of the icons included in the first icon group may be an operation of moving a touch applied to the selected icon to the event related information. This touch operation may include a drag operation and a drop operation.

If the selected icon is changed, at least part of the event related information, used to execute the function corresponding to the selected icon, may be changed. In the meeting schedule alarm event shown in FIG. 7(a), for example, "Gangnam station" corresponding to a meeting place, included in information related to the meeting schedule alarm event, may be used to execute a map search application if the selected icon corresponds to the map search application.

If the selected icon corresponds to a schedule management application, a meeting date and time included in the information related to the meeting schedule alarm event may be used to execute a scheduling application.

The operation of the controller 180 to select an icon from the first icon group varied with a generated event and execute an application corresponding to the selected icon has been described. However, the present invention is not limited thereto. For example, icons displayed on the screen may not be changed even when an event is generated. Even in this case, the controller 180 may select an icon from the icons displayed on the screen in response to a touch operation and execute an application corresponding to the selected icon.

Figure 8:
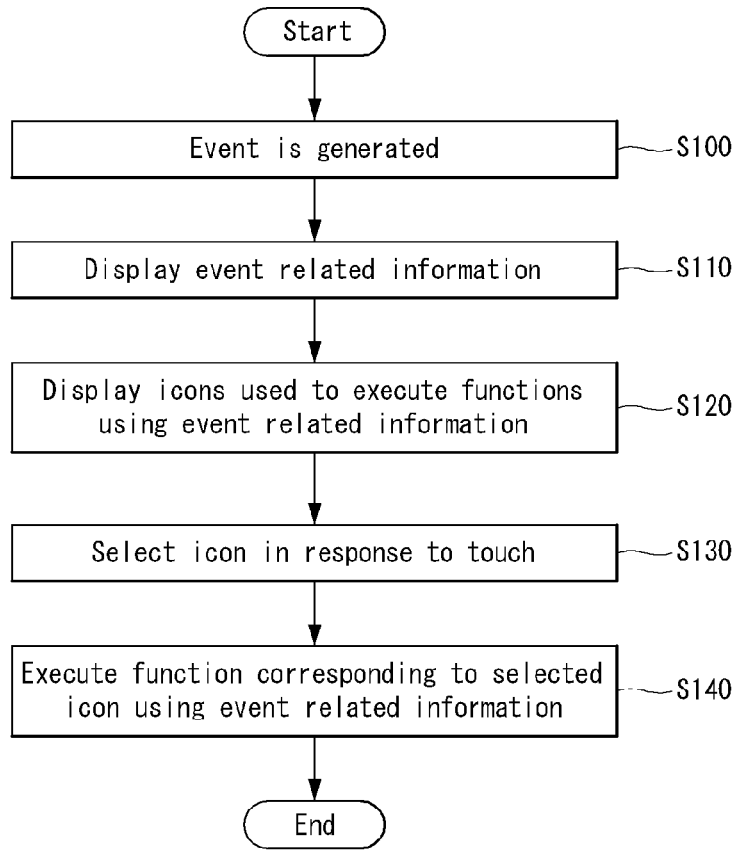
FIG. 8 is a flowchart showing an implementation of a method of controlling a mobile terminal.

FIG. 8 is a flowchart showing an implementation of a method of controlling the mobile terminal 100 shown in FIG. 1. The method of controlling the mobile terminal will now be explained with reference to FIGS. 1 and 8.

When a predetermined event stored in the memory 160 of the mobile terminal 100 is generated in operation S100, the controller 180 of the mobile terminal 100 displays information related to the event on the screen of the display module 151 in operation S110 and displays icons used to execute specific functions using the event related information on the screen in operation S120.

The icons displayed on the screen are reconstituted based on at least one of the attribute of the event and the event related information and may be different from icons displayed on the screen before the event is generated.

When the icons are displayed on the screen, the controller 180 selects one of the icons in response to a touch operation in operation S130. Then, the controller 180 executes a function, that is, an application, which corresponds to the selected icon using the event related information in operation S140. Here, when the icon selected in response to the touch operation is changed, the information used for the application corresponding to the selected icon may be also changed.

Variations in event related information and icons displayed on the screen of the display module 151 according to events that can be generated in the mobile terminal 100 and an operation of executing applications using the event related information and icons will now be explained.

Figure 9:
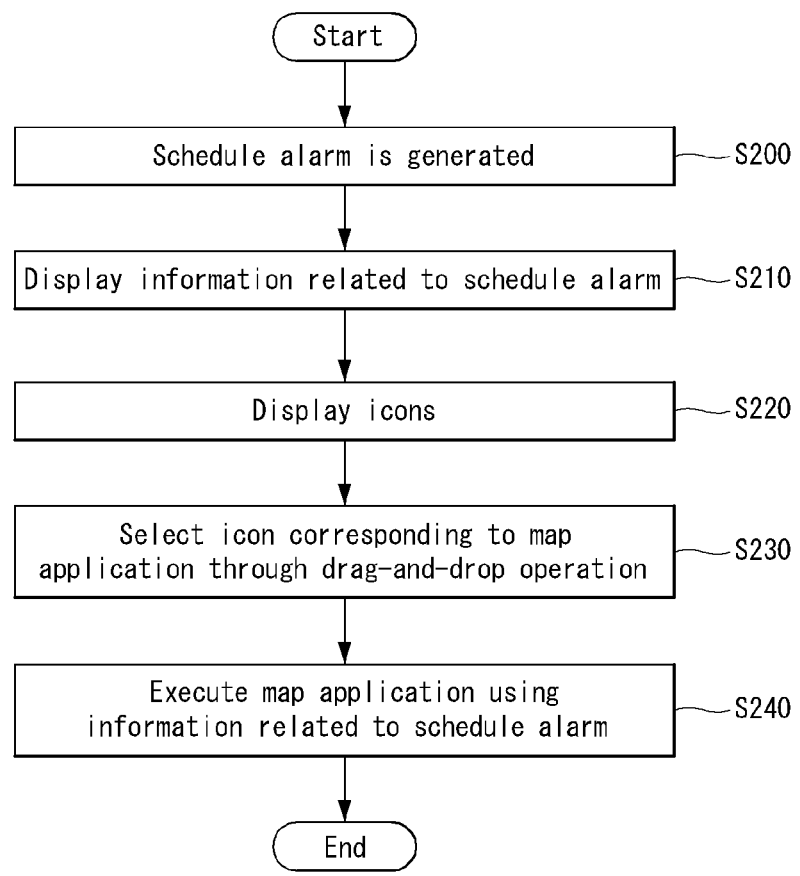
FIG. 9 is a flowchart showing an implementation of a method of controlling the mobile terminal when a schedule alarm event is generated.
Figure 10:
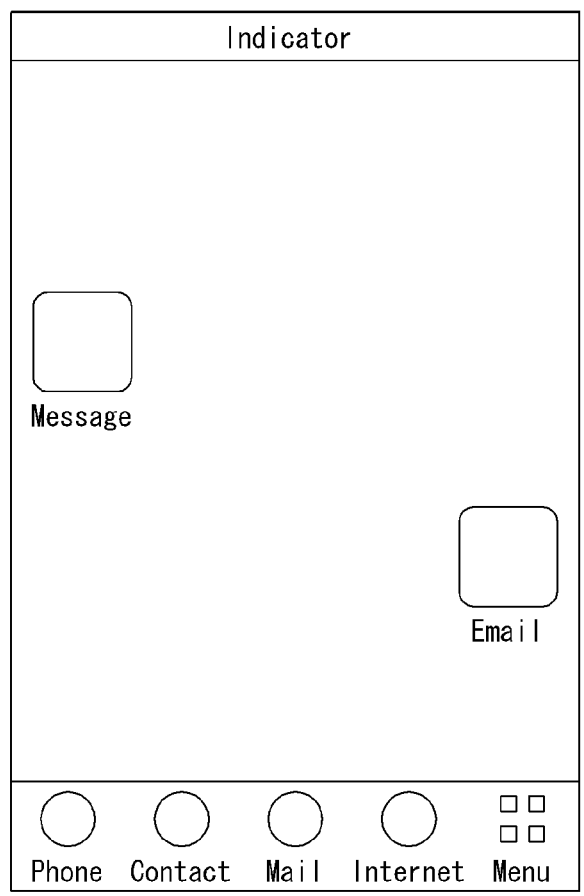
FIGS. 10 through 14 show images displayed on the screen of the mobile terminal when the controlling method shown in FIG. 9 is performed.

FIG. 9 is a flowchart showing an implementation of a method of controlling the mobile terminal when the schedule alarm event is generated and FIGS. 10 through 14 illustrate images displayed on the screen of the mobile terminal 100 when the controlling method shown in FIG. 9 is performed. FIG. 10 shows the screen of the mobile terminal 100 before the scheduler alarm event is generated. Referring to FIG. 10, only an icon corresponding to the E-mail creating application and an icon corresponding to the message generating application are displayed in the idle screen region of the screen.

When the schedule alarm event is generated in operation S200, the controller 180 displays information related to the schedule alarm event on the screen in operation S210 and displays icons respectively corresponding to applications capable of executing specific functions using the information related to the schedule alarm event in operation S220.

Figure 11:
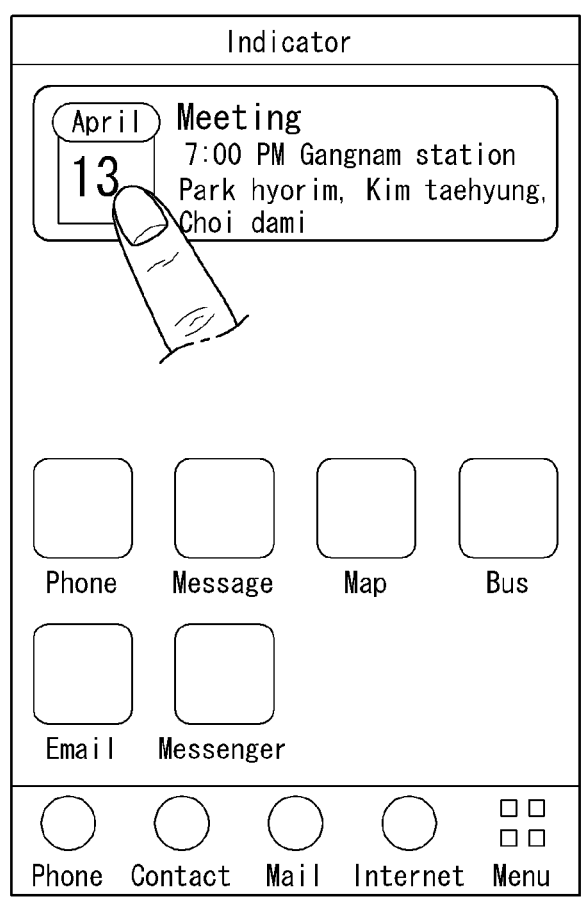

FIG. 11 shows the screen on which the information related to the scheduler alarm event and the icons are displayed. Referring to FIG. 11, the schedule alarm event announces a meeting and the information related to the schedule alarm event may include a meeting title, date, time, place and attendees, etc.

Furthermore, the screen displays icons corresponding to the calling application, the message generating application, a map application, a bus route search application, the E-main creating application and the messenger application, which have high potential to be used by the user who confirms the information or are usefully used by the user.

The applications may be determined based on the attribute of the schedule alarm event and the information related to the schedule alarm event. It can be known from FIGS. 10 and 11 that the icons displayed on the screen before the schedule alarm event is generated is different from the icons displayed on the screen after the schedule alarm event is generated.

Figure 12:
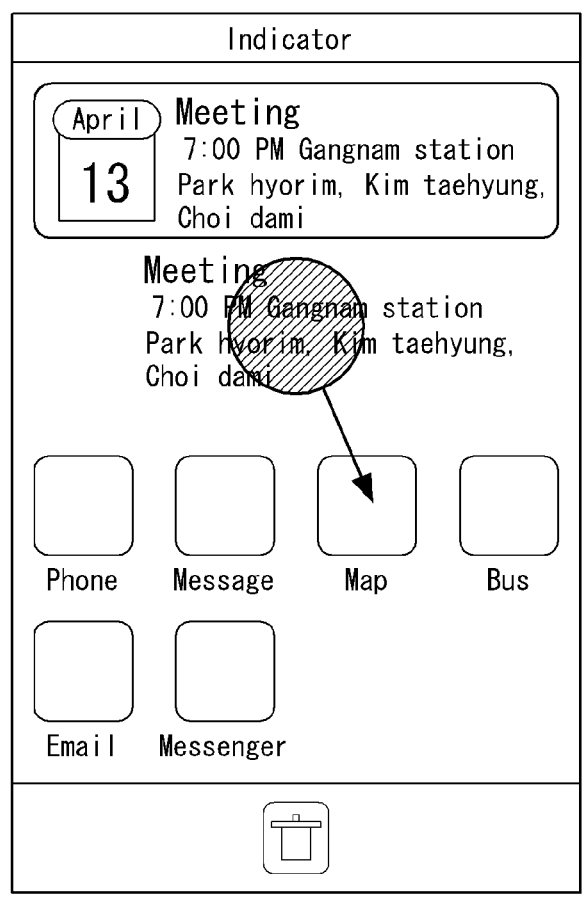

When the icons are displayed on the screen, the user may drag the information related to the schedule alarm event and drop the information to the icon corresponding to the map application to select the map application in operation S230. FIG. 11 shows a touch operation of the user and FIG. 12 shows a drag-and-drop operation of the user. Although the drag-and-drop operation using the touch screen is used as an icon selecting method in the current embodiment, the present invention is not limited thereto.

Referring to FIG. 11, when the user touches the information related to the schedule alarm event, the touched portion is indicated by a circle. In the screen of the mobile terminal 100, a portion indicated by a circle means a portion touched by the user. A user's finger for touching the screen is shown only in FIG. 11.

Figure 13:
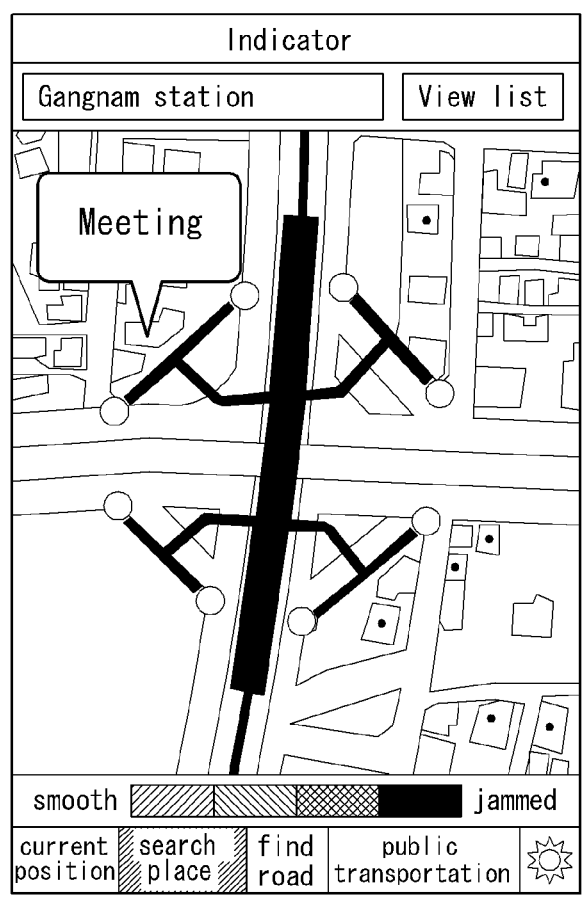

When the map application is selected, the controller 180 executes the map application for searching for "Gangnam station" corresponding to a meeting place, included the information related to the schedule alarm event, in operation S240. FIG. 13 shows a map corresponding to "Gangnam station" displayed on the screen of the mobile terminal 100 according to the execution of the map application.

If the information related to the schedule alarm event includes a plurality of places, the controller 180 may display a place search list on the screen. Then, the controller 180 may display a search result with respect to a touched place on the screen.

Figure 14:
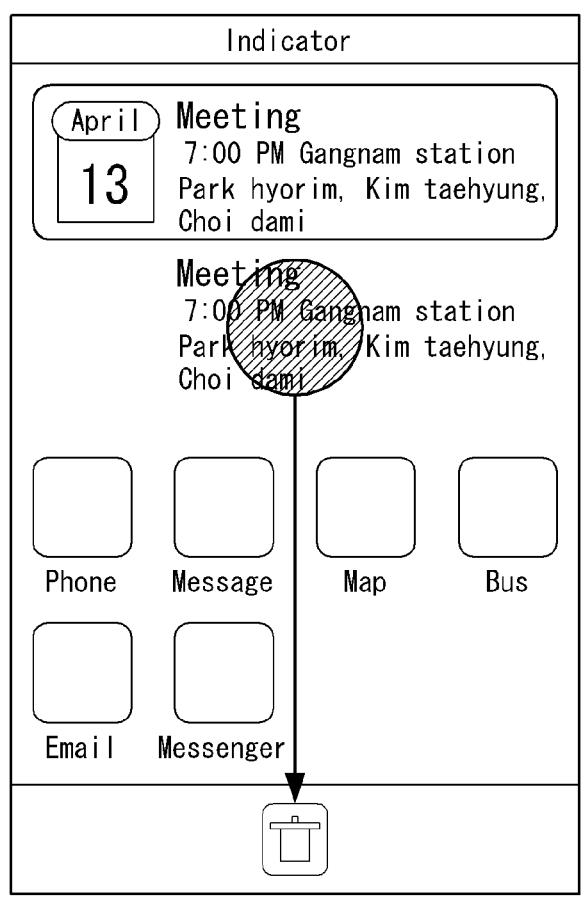

Referring back to FIG. 12, when the user touches the information related to the schedule alarm event, an icon for removing the information related to the schedule alarm event is generated in the general menu region of the screen when the user touches the information related to the schedule alarm event. The controller 180 may remove the information related to the schedule alarm event from the screen based on a drag-and-drop operation performed on the information related to the schedule alarm event and the icons, as shown in FIG. 14. Then, the screen is returned to the initial state before the event is generated, as shown in FIG. 10.

Figure 15:
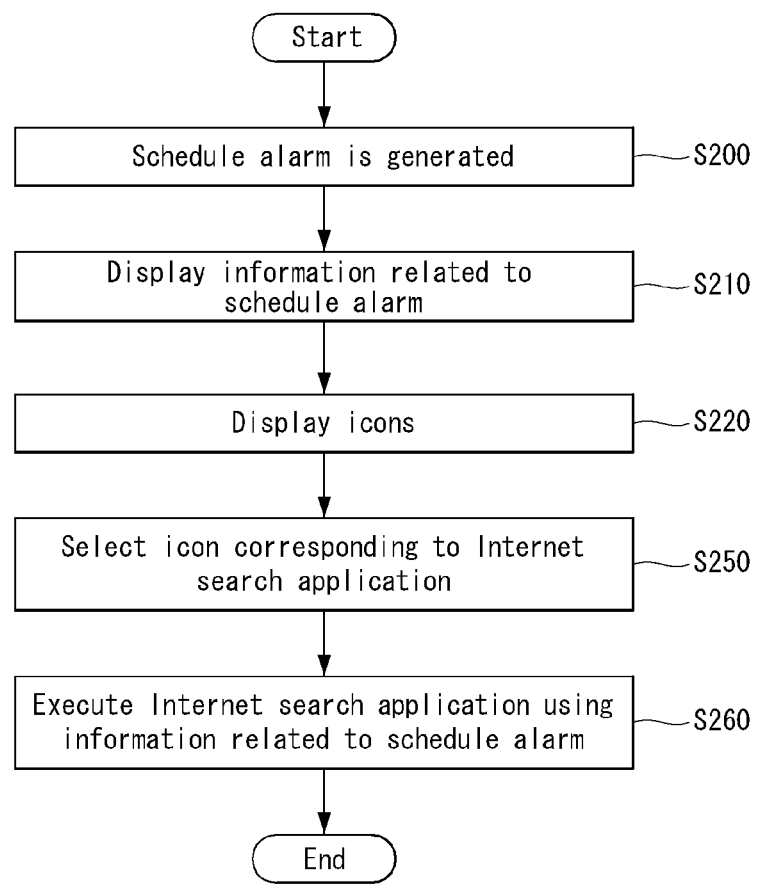
FIG. 15 is a flowchart showing another implementation of a method of controlling the mobile terminal when the schedule alarm event is generated.
Figure 16:
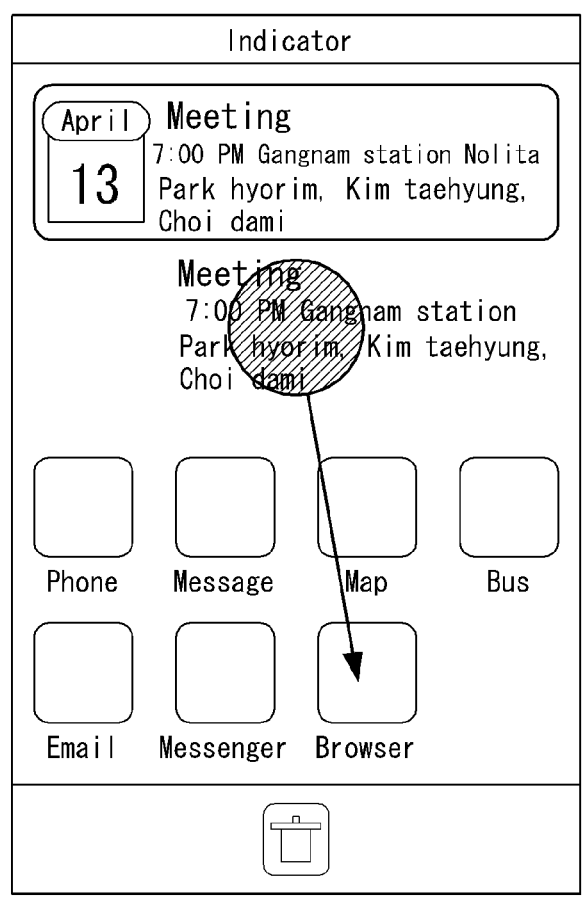
FIGS. 16 and 17 show images displayed on the screen of the mobile terminal when the controlling method shown in FIG. 15 is performed.
Figure 17:
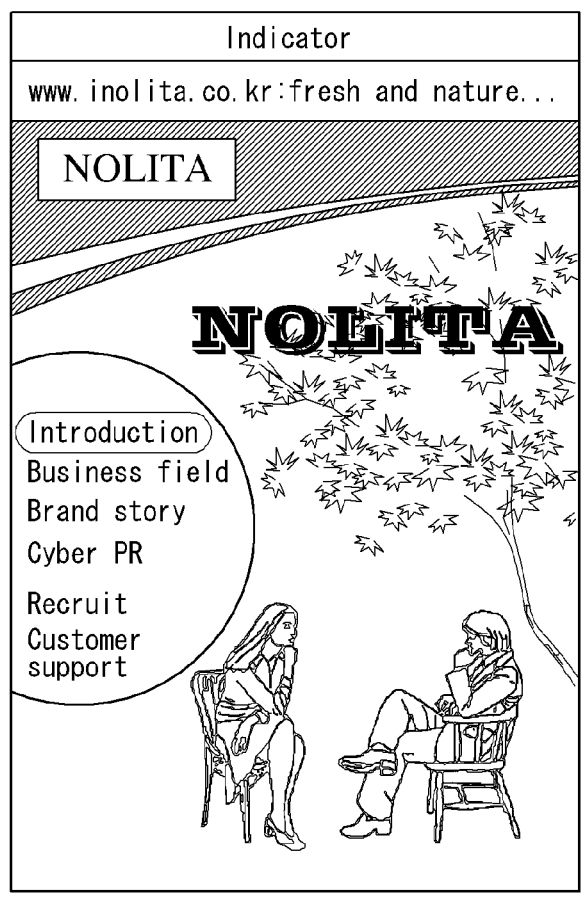

FIG. 15 is a flowchart showing another implementation of a method of controlling the mobile terminal 100 when the schedule alarm event is generated and FIGS. 16 and 17 show images displayed on the screen of the mobile terminal 100 when the controlling method shown in FIG. 15 is performed. The method of controlling the mobile terminal will now be explained with reference to FIGS. 15, 16 and 17.

Operations S200, S210 and S220 shown in FIG. 15 have been described with reference to FIG. 9 so that explanations thereof are omitted. When the icons are displayed on the screen, the user may drag the information related to the schedule alarm event and drop the information to an icon corresponding to an Internet search application to select the Internet search application in operation S250. FIG. 16 shows the drag-and-drop operation of the user.

When the Internet search application is selected, the controller 180 executes the map application for searching for "Gangnam station NOLITA" corresponding to a meeting place, included in the information related to the schedule alarm event, in operation S260. FIG. 17 shows the Internet site "NOLITA" searched according to the execution of the Internet search application and displayed on the screen of the mobile terminal 100. If there are plural places in the name of "NOLITA" around "Gangnam station", the controller 180 may display a place search list. Then, the controller 180 may display a search result with respect to a place touched by the user on the screen.

Figure 18:
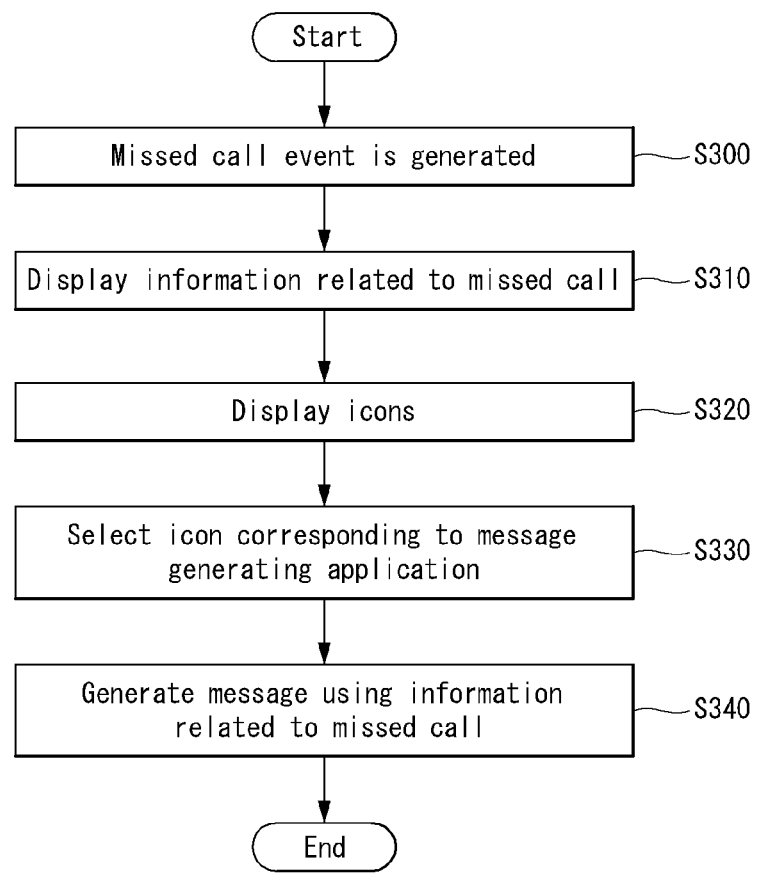
FIG. 18 is a flowchart showing an implementation of a method of controlling the mobile terminal when a missed call event is generated.
Figure 19:
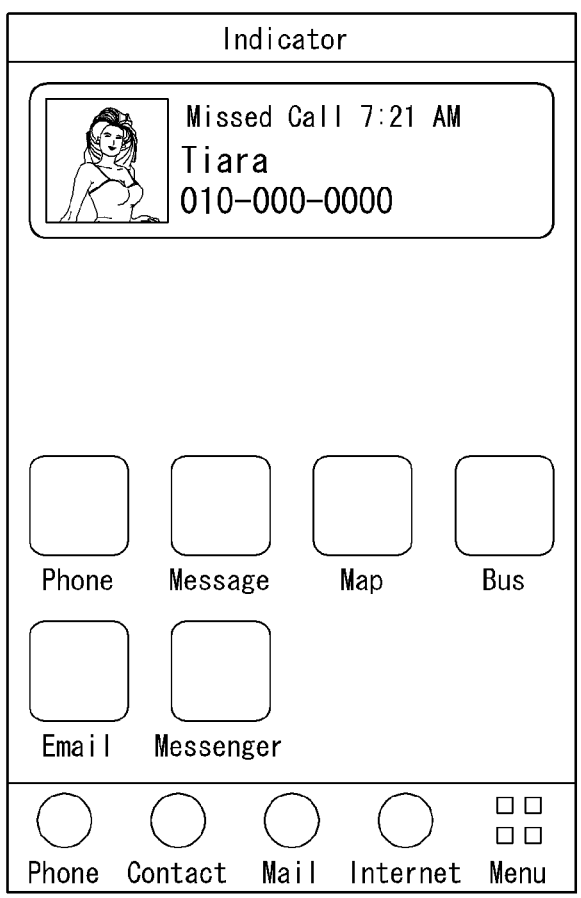
FIGS. 19, 20 and 21 show images displayed on the mobile terminal when the controlling method shown in FIG. 18 is performed.
Figure 20:
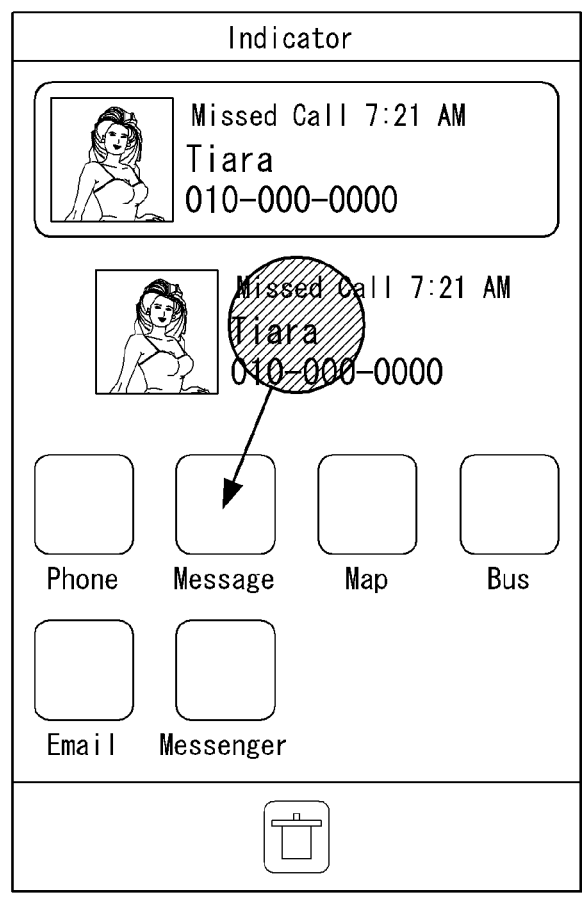
Figure 21:
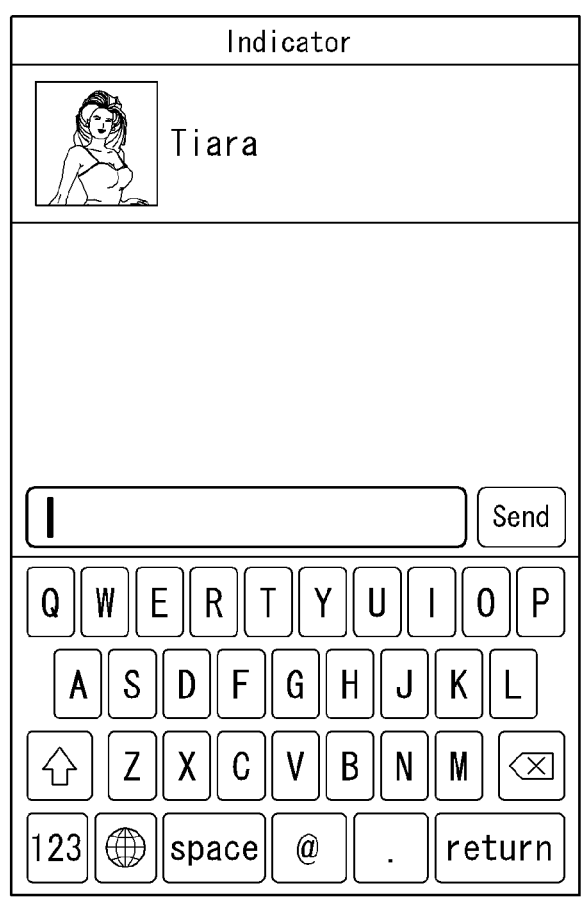

FIG. 18 is a flowchart showing an implementation of a method of controlling the mobile terminal 100 when the missed call event is generated and FIGS. 19, 20 and 21 show images displayed on the screen of the mobile terminal 100 when the controlling method shown in FIG. 18 is performed. The method of controlling the mobile terminal will now be explained with reference to FIGS. 18, 19, 20 and 21.

When the missed call event is generated in operation S200, the controller 180 displays information related to the missed call event on the screen in operation S310 and displays icons respectively corresponding to applications capable of executing specific functions using the information related to the missed call event on the screen in operation S320.

FIG. 19 shows the screen on which the information related to the missed call event and the icons are displayed. Referring to FIG. 19, the information related to the missed call event may include a missed call generation time, caller, picture of the caller, and calling number, etc.

Furthermore, icons corresponding to the calling application, the message generating application, the map application, the bus route search application, the E-mail creating application, and the messenger application, which have high potential to be used by the user or are usefully used by the user, are generated and displayed on the screen. These applications may be determined based on the attribute of the missed call event and the information related to the missed call event.

When the icons are displayed on the screen, the user may drag the information related to the missed call event and drop the information to the icon corresponding to the message generating application to select the message generating application in operation S330. FIG. 20 shows the drag-and-drop operation of the user.

When the message generating application is selected, the controller 180 executes the message generating application to generate a message to be sent to the caller with the calling number "010-000-0000" included in the information related to the missed call event in operation S340 and the user may create the message and send the message. FIG. 21 shows the screen when the message generating application has been executed.

Figure 22:
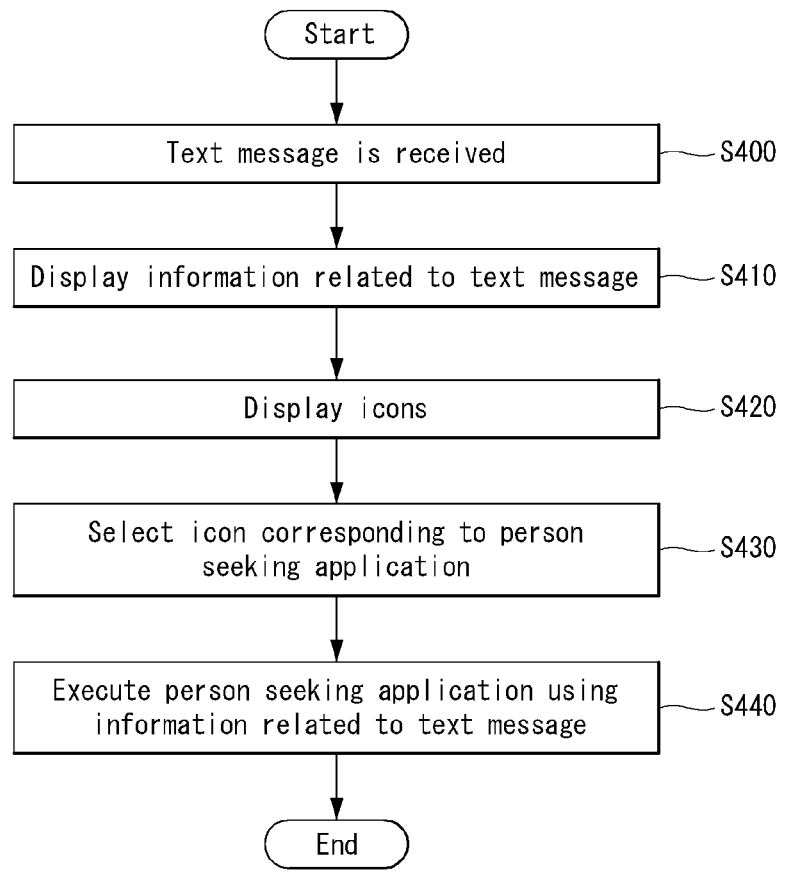
FIG. 22 is a flowchart showing an implementation of a method of controlling the mobile terminal when a text message receiving event is generated.
Figure 23:
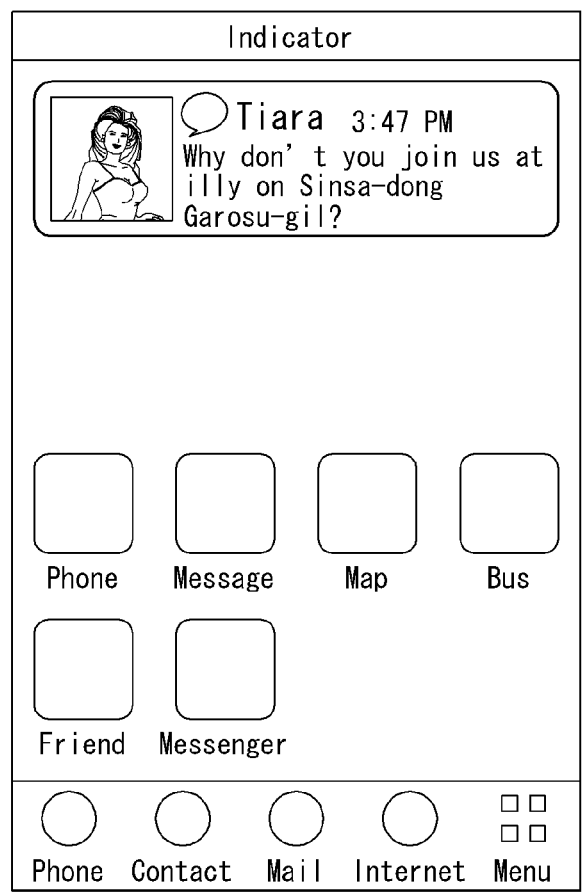
FIGS. 23, 24 and 25 show images displayed on the mobile terminal when the controlling method shown in FIG. 22 is performed.
Figure 24:
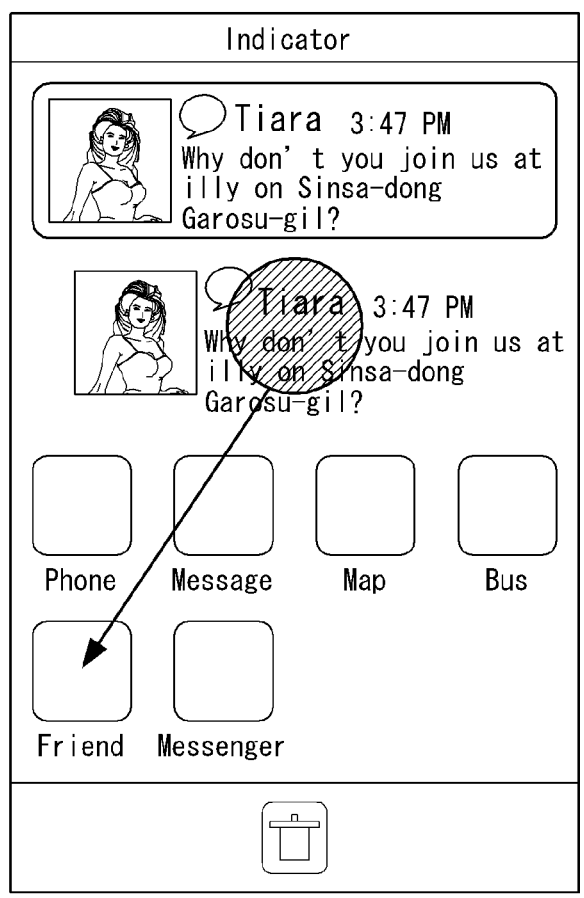
Figure 25:

FIG. 22 is a flowchart showing an implementation of a method of controlling the mobile terminal when a text message receiving event is generated and FIGS. 23, 24 and 25 show images displayed on the screen of the mobile terminal 100 when the controlling method shown in FIG. 22 is performed.

When the text message receiving event is generated in operation S400, the controller 180 displays information related to the text message receiving event on the screen in operation S410 and displays icons corresponding to applications capable of executing specific functions using the information related to the text message receiving event in operation S420.

FIG. 23 shows the screen on which the information related to the text message receiving event and the icons are displayed. Referring to FIG. 23, the information related to the text message receiving event may include a message sender, a message receiving time and contents of the text message.

Furthermore, icons corresponding to the calling application, the message generating application, the map application, the bus route search application, a person seeking application, and the messenger application, which have high potential to be used by the user or are usefully used by the user, are generated and displayed on the screen. These applications may be determined based on the attribute of the text message receiving event and the information related to the text message receiving event.

When the icons are displayed on the screen, the user may drag the information related to the text message receiving event and drop the information to the icon corresponding to the person seeking application to select the person seeking application in operation S430. FIG. 24 shows the drag-and-drop operation of the user.

When the person seeking application is selected, the controller 180 executes the person seeking application to search for the current position of the message sender "Tiara", included in the information related to the text message receiving event, in operation S440. FIG. 25 shows the screen of the mobile terminal 100 on which the position of "Tiara" searched according to the execution of the person seeking application is indicated.

Figure 26:
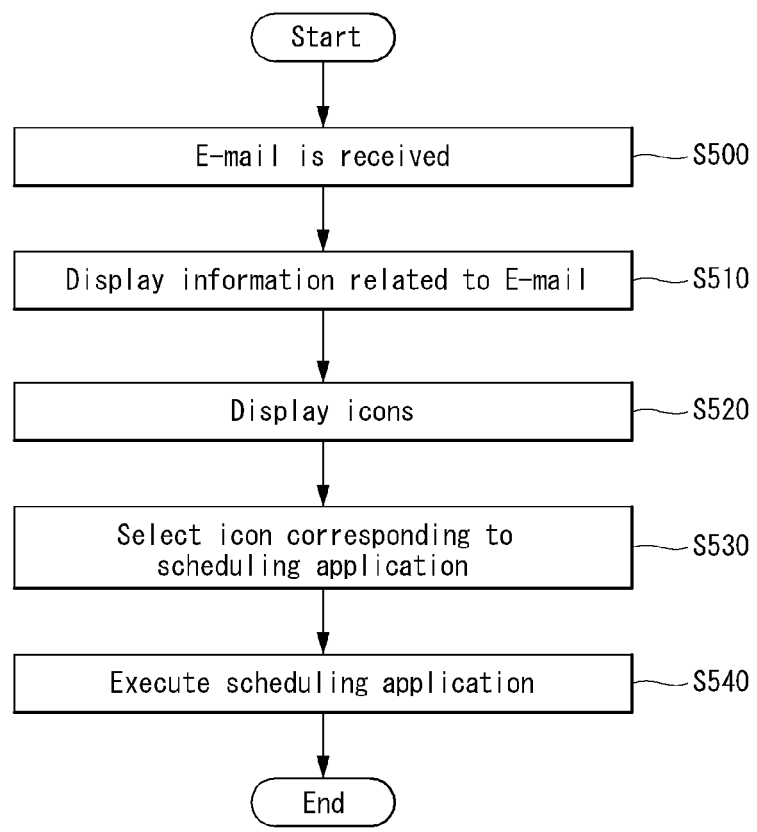
FIG. 26 is a flowchart showing an implementation of a method of controlling the mobile terminal when an E-mail receiving event is generated.
Figure 27:
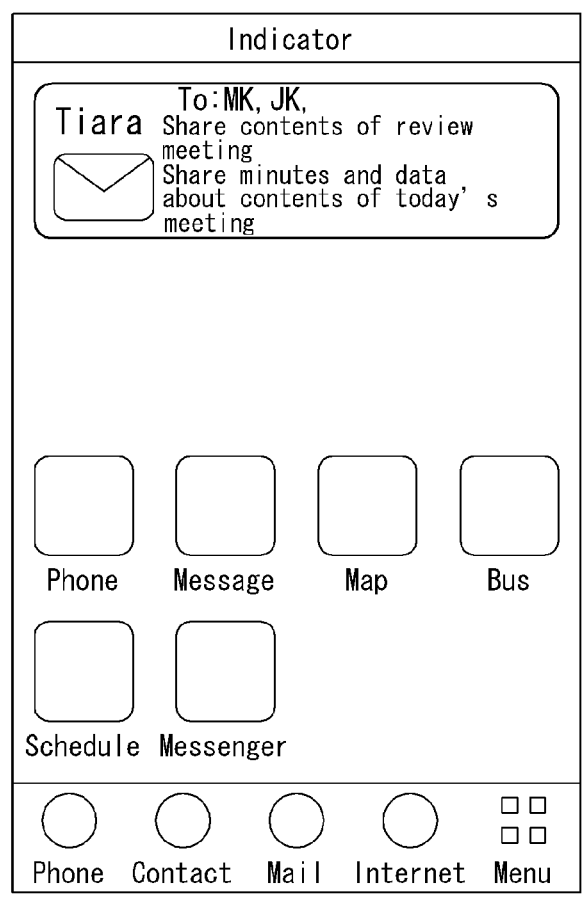
Figure 28:
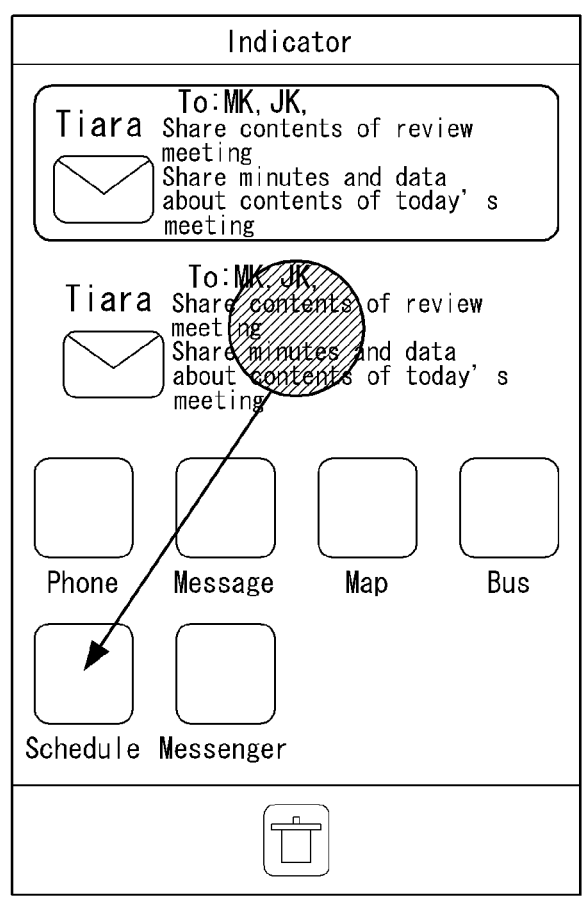

FIG. 26 is a flowchart showing an implementation of a method of controlling the mobile terminal when the E-mail receiving event is generated and FIGS. 27, 28 and 29 show images displayed on the screen of the mobile terminal 100 as the controlling method shown in FIG. 26 is performed.

When the E-mail receiving event is generated in operation S500, the controller 180 displays information related to the E-mail receiving event on the screen in operation S510 and displays icons corresponding to applications capable of executing specific functions using the information related to the E-mail receiving event in operation SS20.

FIG. 27 shows the screen on which the information related to the E-mail receiving event and the icons are displayed. Referring to FIG. 27, the information related to the E-mail receiving event may include an E-mail sender, the title of E-mail, and contents of E-mail.

Furthermore, icons corresponding to the calling application, the message generating application, the map application, the bus route search application, the scheduling application, and the messenger application, which have high potential to be used by the user or are usefully used by the user, are generated and displayed on the screen. These applications may be determined based on the attribute of the E-mail receiving event and the information related to the E-mail receiving event.

When the icons are displayed on the screen, the user may drag the information related to the E-mail receiving event and drop the information to the icon corresponding to the scheduling application to select the scheduling application in operation S530. FIG. 28 shows the drag-and-drop operation of the user.

When the scheduling application is selected, the controller 180 executes the scheduling application and registers a schedule made by the user with reference to the information related to the received E-mail in operation S540. FIG. 29 shows the screen of the mobile terminal 100 when the scheduling application has been executed.

The above-described methods of controlling the mobile terminal may be written as computer programs and may be implemented in digital microprocessors that execute the programs using a computer readable recording medium. The methods of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include magnetic media such as hard discs, floppy discs and magnetic tapes, magneto-optical media such as floptical discs, and hardware devices constructed to store and execute program commands, such as read-only memory (ROM), random-access memory (RAM), flash memory. Examples of programs may include high-level language codes executable by computers using an interpreter as well as machine language codes generated by a compiler. The hardware devices may be constructed to operate by at least one software module to perform the operations of the mobile terminal, and vice versa.

Although embodiments have been described with reference to a number of illustrative embodiments thereof, it should be understood that numerous other modifications and embodiments can be devised by those skilled in the art that will fall within the spirit and scope of the principles of this disclosure. Therefore, the scope of the invention is defined not by the detailed description of the invention but by the appended claims, and all differences within the scope will be construed as being included in the present invention.

INDUSTRIAL APPLICABILITY

According to the present invention, a mobile terminal and a method of controlling the same for changing displayed icons according to a generated event and executing various functions based on information related to the event can be provided.

The invention claimed is:

1. A mobile terminal comprising:
a touch screen; and
a controller configured to:
display a first screen on the touch screen, the first screen including a first region including a first plurality of application icons and a second region including a second plurality of application icons,
display a second screen on the first region when an incoming event is generated, wherein the second screen includes event information related to the generated incoming event displayed on one side of the first region and a third plurality of application icons respectively corresponding to applications configured to execute functions on the other side of the first region, and display a portion of the first screen including the second region including the second plurality of application icons respectively corresponding to applications configured to execute functions, and wherein applications corresponding to the third plurality of application icons are capable of executing functions using the event information of the generated incoming event,
in response to dragging the event information of the generated incoming event, replace the displayed second region including the second plurality of application icons with a delete icon,
in response to dragging and dropping the event information of the generated incoming event on one of the third plurality of application icons, execute a specific function of an application respectively corresponding to the one of the third plurality of application icons using at least part of the event information of the generated incoming event and display an execution screen corresponding to the specific function of the application, and
re-display the first screen including the first plurality of application icons on the first region and the second plurality of application icons on the second region when the dragged event information of the generated incoming event is dropped on the delete icon,
wherein the first plurality of application icons are different from the third plurality of application icons, and the third plurality of application icons are selected based on an attribute of the incoming event, and
wherein the second plurality of application icons are displayed in the second region during an idle state and independent from the incoming event.

2. The mobile terminal of claim 1, wherein the first screen includes the second plurality of application icons different from the first plurality of application icons.

3. The mobile terminal of claim 1, wherein the controller selects the third plurality of application icons from icons stored in a memory of the mobile terminal based on at least one of attribute information of the generated event and the event information related to the generated event.

4. The mobile terminal of claim 1, wherein the controller changes the application icons included in the third plurality of application icons when the generated event is changed.

5. The mobile terminal of claim 1, wherein when the one of the application icons is changed, the at least part of the event information, used to execute the specific function corresponding to the one of application icons, is changed.

6. The mobile terminal of claim 1, wherein the generated event related to at least one of transmission/receiving of a message including at least one of a SMS message, a MMS message and E-mail, transmission/receiving of a call, and alarm.

7. The mobile terminal of claim 1, wherein the third plurality of application icons are different for different events.

\* \* \* \* \*